United States Patent [19]

Chakraborty

[11] Patent Number: 5,495,511
[45] Date of Patent: Feb. 27, 1996

[54] DEVICE FOR PASSIVELY INERTING THE GAS MIXTURE IN THE REACTOR CONTAINMENT OF A NUCLEAR POWER PLANT

[75] Inventor: Amiya K. Chakraborty, Erfstadt, Germany

[73] Assignee: Gesellschaft für Anlagen- und Reaktorsicherheit (GRS) mbH, Cologne, Germany

[21] Appl. No.: 292,684

[22] Filed: Aug. 18, 1994

[30] Foreign Application Priority Data

Aug. 24, 1993 [DE] Germany .............................. 93113522

[51] Int. Cl.⁶ .................................................. G21C 9/00
[52] U.S. Cl. .......................... 376/301; 376/300; 376/293; 376/279
[58] Field of Search ...................... 376/301, 300, 376/293, 279; 423/427, 426, 600; 252/2, 7, 8; 976/DIG. 151

[56] References Cited

U.S. PATENT DOCUMENTS

| | | | |
|---|---|---|---|
| 2,718,460 | 9/1955 | Bowen ........................................ | 23/288 |
| 2,943,921 | 7/1960 | King ............................................ | 23/288 |
| 3,469,947 | 9/1969 | Drury ........................................... | 23/281 |
| 3,479,144 | 11/1969 | Brose ........................................... | 23/288 |
| 3,490,878 | 1/1970 | Russel ......................................... | 23/288 |
| 3,660,041 | 5/1972 | Moore et al. ............................... | 23/262 |
| 3,859,053 | 1/1975 | Parnes ......................................... | 23/288 R |
| 4,006,562 | 7/1986 | Virk et al. .................................. | 49/380 |
| 4,008,050 | 2/1977 | Betz ............................................ | 23/288 R |
| 4,050,983 | 9/1977 | Kleimola ..................................... | 376/283 |
| 4,101,280 | 7/1978 | Frietzsche et al. ........................ | 23/288 |
| 4,119,706 | 10/1978 | Rogers ........................................ | 423/580 |
| 4,125,380 | 11/1978 | Negola ........................................ | 422/180 |
| 4,139,603 | 2/1979 | Weems et al. ............................. | 423/580 |
| 4,149,976 | 4/1979 | Reuillo et al. .............................. | 252/5 |
| 4,210,614 | 7/1980 | Kleimola ..................................... | 261/124 |
| 4,226,675 | 10/1980 | Lewis et al. ............................... | 376/256 |
| 4,228,132 | 10/1980 | Weems et al. ............................. | 422/174 |
| 4,303,553 | 12/1981 | Aoki et al. ................................. | 252/478 |
| 4,407,774 | 10/1983 | Schretzmann et al. ................... | 376/300 |
| 4,509,966 | 4/1985 | Dimick et al. ............................. | 55/502 |

(List continued on next page.)

FOREIGN PATENT DOCUMENTS

| | | |
|---|---|---|
| 0303144 | 2/1989 | European Pat. Off. . |
| 0416143 | 3/1991 | European Pat. Off. . |
| 0436942 | 7/1991 | European Pat. Off. . |
| 2633113 | 1/1978 | Germany . |
| 3727207 | 2/1989 | Germany . |
| 3816012 | 11/1989 | Germany . |
| 4036126 | 5/1992 | Germany . |
| 4202089 | 7/1993 | Germany . |
| 61-213795 | 9/1986 | Japan . |

OTHER PUBLICATIONS

Fineschi,"A Strategy for Dealing with Risks Due to Hydrogen Explosions in the Containments . . . ," Nuclear Safety, Jul./Sep. 1991, pp. 380–387.

Kumar, et al., "Hydrogen Combustion Mitigation Concepts for Nuclear Reactor Containment Buildings," Nuclear Safety, Jul./Sep. 1992, pp. 398–414.

*Primary Examiner*—Donald P. Walsh
*Assistant Examiner*—Meena Chelliah
*Attorney, Agent, or Firm*—Thomas A. Gallagher; David N. Lathrop

[57] ABSTRACT

A device for passively inerting the gas mixture forming in the reactor containment of a nuclear power plant in an accident situation is proposed, which device is based on the use of chemical substances which react or disintegrate, releasing an inerting gas or gas mixture when a certain temperature of reaction is reached. This device is especially suitable for use in connection with catalytic recombiners for removing hydrogen through oxidation with the oxygen present. The heat resulting from this exothermic process of recombination can be put to use for heating up chemical substances to the required temperature, these having temperatures of reaction that lie above the temperature (approximately 100° C.) that develops in the reactor containment in an accident situation.

18 Claims, 4 Drawing Sheets

U.S. PATENT DOCUMENTS

| | | | |
|---|---|---|---|
| 4,556,543 | 12/1985 | Mochida et al. | 422/171 |
| 4,707,341 | 11/1987 | Koch et al. | 422/171 |
| 4,755,359 | 7/1988 | Klatt et al. | 422/113 |
| 4,797,249 | 1/1989 | Schweiger | 376/279 |
| 4,865,630 | 9/1989 | Abe | 55/158 |
| 4,869,845 | 9/1989 | Hasegawa et al. | 252/609 |
| 4,911,879 | 3/1990 | Heck et al. | 376/301 |
| 4,992,407 | 2/1991 | Chakraborty et al. | 502/327 |
| 5,040,609 | 8/1991 | Dougherty, Jr. et al. | 169/45 |
| 5,061,382 | 10/1991 | Halter et al. | 252/2 |
| 5,128,060 | 7/1992 | Ueno et al. | 252/184 |
| 5,130,079 | 7/1992 | Chakraborty | 376/301 |
| 5,236,617 | 8/1993 | Ueno et al. | 252/188.28 |

DEVICE FOR PASSIVELY INERTING THE GAS MIXTURE IN THE REACTOR CONTAINMENT OF A NUCLEAR POWER PLANT

TECHNICAL FIELD

The present invention relates to a device for preventing the formation of a flammable mixture of hydrogen and oxygen in the reactor containment of a nuclear power plant in the event of an accident involving the release of hydrogen with a simultaneous rise in temperature.

BACKGROUND ART

During the build-up leading to a serious accident in a nuclear power plant chemical processes of various natures cause hydrogen to be produced. This can lead to the formation of flammable gas mixtures in the reactor containment. If hydrogen is released and concentrated over a longer period of time, mixtures capable of detonation can be formed. This means that the integrity of the reactor containment, the last barrier for the retention of fission products, will be jeopardized. (The term "reactor containment" is used here as a generic term for all compartments in which the problem described may arise and must thus be solved).

Known in the art are measures for the prevention of the danger arising from such a flammable gas mixture that are aimed at eliminating the hydrogen in the compartments of a reactor containment. These measures include the use of igniters, as well as the catalytic recombination into water of the hydrogen with the oxygen present in the reactor containment (e.g., EP-A-0 303 144). Especially promising is the use of catalytic recombiners, which meanwhile have become known in the art in various designs (EP-A-0416 143, DE-A-36 04 416, EP-A-0 303 144, DE-A-40 03 833), although these are not fully capable of eliminating the danger of a detonation or even a deflagration, for reasons that will be explained in the following.

Depending on the steam content of the atmosphere within the compartments of a reactor containment, the deflagration limit may be reached even with a local concentration of hydrogen of as little as 4%. It is a known fact that steam has an inerting property, which is to say that with a higher steam content the deflagration limit is not reached until higher concentrations of hydrogen are generated. (The term "inerting," which is translated from the German word "Inertisierung," is used herein to mean decreasing the danger of explosion of an explosive gas mixture by reducing the concentration of explosive components in the gas mixture.) From model tests it is known that at the beginning of a nuclear core melt-down accident steam is released first while hydrogen is not released until after a certain delay. The composition of the gas mixtures in the different compartments of a reactor containment can, however, vary from one another very extensively and can change continuously during the further progression of the accident.

The reaction speed of the catalytic recombiners (catalysts) increases exponentially with the temperature. The catalysts heat up until an equilibrium is reached between the heat that is produced and the heat that is carried off. It is only after higher catalyst temperatures have been reached that the reduction of hydrogen will accelerate and the convection resulting from the increase in temperature will cause mixing of the surrounding atmosphere.

If the supply of hydrogen within a given compartment proceeds faster than it is eliminated, an increased hydrogen concentration will result within the gas mixture. The steam content, which at first will not necessarily be equal in all compartments of the reactor containment, will be reduced during the continued course of the process by condensation at the cold walls, thereby reducing its inerting effect.

The so-called detonation cell size constitutes a measure for the propagation of a detonation as well as for the sensitivity of a gas mixture to detonation. The smaller the cell size, the greater will be the susceptibility of the gas mixture to detonation. It is known that dilution of the gas mixture containing hydrogen by the use of steam and even more by $CO_2$ causes an increase in the detonation cell size. This is true for both lower and higher temperatures. In a gas mixture at 100° C. with a stoichiometric composition, the detonation cell size will be increased fivefold or 34-fold by the addition of 10% or 20% by volume of $CO_2$, respectively (fourfold or sixfold in the case of steam), compared to that without the addition of $CO_2$ (or steam). Nothing has been demonstrated so far about what the effect would be of diluting the gas mixture simultaneously with steam and $CO_2$. It may be assumed, however, that the effect would be at least additive.

The detonation cell size of a gas mixture of like composition will be reduced through an increase in temperature and pressure. During an accident situation a temperature of around 100° C. will prevail in the compartments of the reactor containment. Opposing this, a significantly lower temperature in the gas mixture can result in the immediate vicinity of a cold concrete wall. This will cause an increase in the detonation cell size. However, the detonation cell size of the gas mixture will potentially tend to decrease at the same time because of a reduction in the steam content owing to condensation.

Consideration has been given to the possibility of making use of the inerting effect of $CO_2$ to prevent the danger of detonation during an accident situation in a reactor containment. In conjunction with this, a distinction has been made of a so-called pre-inerting and a so-called post-inerting. In pre-inerting the compartments of the reactor containment of the nuclear power plant are filled with nitrogen ($N_2$) so that when an accident begins to occur, no oxygen would be available to form a flammable gas mixture with the hydrogen that would then be produced. But such a type of pre-inerting involves such practical problems that no actual significance attaches to it. It is sufficient to merely mention that problems would arise with accessing a reactor containment containing a pure nitrogen atmosphere during normal operation.

By post-inerting is meant an injection of liquid $CO_2$ into the reactor containment that is triggered only at the onset of an accident. This post-inerting represents an active safety measure and for this reason in itself is not very realistic. The word "active" means that some sort of device has to be present which senses the fact that an accident has occurred and which activates the introduction of $CO_2$. Every type of active measure suffers from the fact that it cannot be relied on one hundred per cent to function properly in an emergency. In addition, serious problems arise from feeding in cold $CO_2$ of −78° C. Feeding in this cold gas would cause a drastically increased condensation of the steam present in the reactor containment and cancel its inerting effect. In addition, this injection would of necessity lead to a subsequent increase in pressure, which, as explained above, would reduce the detonation cell size. Finally, it is very uncertain what the effect would be of the low temperatures involved in supplying cold gas on the relevant safety devices in the reactor containment.

The catalytic recombiners, which are passive safety devices, represent mechanisms contributing considerably to reduce the risks involved in an accident situation as described, but they do not eliminate the danger. The possibilities of both pre-inerting and post-inerting do not appear to be practicable.

SUMMARY OF THE INVENTION

The object of the present invention is to create a device of the type indicated at the beginning which in case of an accident would have the effect of making the atmosphere in the reactor containment inert without being encumbered with the problems described for pre-inerting and post-inerting.

This object is achieved in accordance with the present invention by a device as described in claim 1.

Preferred embodiments of the invention are set forth in the dependent claims.

The present invention offers the possibility for a passive inerting that does not require any auxiliary energy. To achieve this passive inerting, chemical substances are employed as inerting materials, which triggered by the rise in temperature that sets in when an accident occurs, release an inerting gas or gas mixture, e.g., $CO_2$ and/or steam, into the reactor containment. This can involve two different types of chemical substance, those which are allowed to react with one another when a certain temperature is reached (temperature of reaction) or materials which disintegrate, releasing the inerting gas or gas mixture when a certain temperature of reaction is reached. The first of the above types includes substances which, when coming into contact with one another, will also react with one another even at much lower temperatures than the temperatures considered as temperatures of reaction in the instance under discussion here. These substances must obviously not come into contact with one another until the onset of an accident. But this can be accomplished in a passive manner by using, say, a membrane to keep the substances separated from one another, which membrane liquefies when a target temperature is reached or otherwise releases the chemical substances into direct contact to react with one another.

Examples of materials which can be made to react when a certain temperature is reached to release an inerting gas or gas mixture (here $CO_2$ and steam) are calcium bicarbonate in conjunction with hydrochloric acid and potassium permanganate in conjunction with a mixture of oxalic acid and some sulfuric acid.

The following compounds are examples of inerting materials which, when a certain temperature is reached, will disintegrate, releasing $CO_2$ and/or steam and can be used for purposes of the present invention:

Smithsonite ($ZnCO_3$) exists in the form of a white powder with a density of approximately 4 g/cm$^3$. This compound has a disintegration temperature of 300° C., at which gaseous $CO_2$ is released. The portion of $CO_2$ in the molecular weight of this compound is 49%. Zinc oxide (ZnO) remains as a reaction product following the reaction and has a high melting point of 1260° C.

Iron(II) oxalate ($FeC_2O_4.2H_2O$) exists in the form of yellowish crystals with a density of some 2 g/cm$^3$. This compound disintegrates at a temperature of 190° C. into $FeO+CO_2+CO+2H_2O$. The portion of $CO_2$ and water of crystallization in this compounds is 25% and 20%, respectively. This means that, given 100 g of this compound at 190° C., 25 g of $CO_2$ and 20 g of steam can be released for inerting. The FeO remaining after disintegration reacts with the oxygen present in the air and transforms into a higher form of oxide. This brings the additional advantage of lowering the partial pressure of oxygen inside the reactor containment, thus also contributing to the inerting process.

Iron(II) carbonate ($FeCO_3$), which is found in nature and is known as siderite, disintegrates into iron oxide (FeO) and carbon dioxide ($CO_2$) at approximately 300° C. The portion of $CO_2$ in the molecular weight of this compound is 38 g. In this case the occurrence of iron oxide resulting from disintegration also reacts with the oxygen present in the atmosphere of the reactor containment.

Borax ($Na_2B_4O_7.10H_2O$) is found in nature under the name of tincal. In its pure state, borax is formed of large, colorless, transparent crystals superficially efflorescent in dry air, which when heated to 350° to 400° C. transform into anhydrous $Na_2B_4O_7$ with a melting point of 878° C. The portion of water of crystallization in the molecular weight is 47%.

Potassium aluminum sulfate ($KAl(SO_4)_2.12H_2O$) is found in nature. Of the 12 molecules of water, six are in a loose bonding with the potassium and the other six in tight bonding with the aluminum. This means that when a temperature of 100° C. is reached, first, half the water of crystallization is released in the form of steam and later, at a higher temperature, the remaining half. The portion of the water of crystallization in the molecular weight is 45.5%.

The compound $[Mg(MgCO_3)_4](OH)_25H_2O$ exists in the form of a white powder and is known in the industry as "magnesia alba" or "magnesium carbonate". The portion of $CO_2$ and $H_2O$ in the molecular weight of this compound amounts to 51% and 23%, respectively.

The use of inerting elements according to the present invention offers, among others, the following substantial advantages:

inerting is completely passive, i.e., no auxiliary source of energy is required that might fail to function in case of an accident;

inerting does not take place until it is needed, i.e., during normal operation of the reactor the compartments protected in accordance with the present invention can be accessed without any added hindrance whatsoever;

by the selection of the quantity and type of the inerting materials with their respective temperatures of reaction, the degree of inerting can be achieved that, depending on the expected quantity of hydrogen that will be released, is necessary for avoiding a deflagration or detonation;

the inerting process controlled to meet the need does not cause any excessive increase in pressure;

after the initial inerting process, catalytic recombiners also present can operate at higher temperatures and thus be more effective, without this higher temperature posing a risk.

The passive inerting according to the present invention as a rule is employed in addition to the use of catalytic recombiners. According to a preferred embodiment, additional advantages can be achieved by exploiting the synergistic effects of the two measures.

As already mentioned at the beginning, the catalyst structures used as catalytic recombiners heat up because of an exothermic reaction. If the chemical substances used in accordance with the present invention are placed in the vicinity of a catalyst structure, then the heat developed from the latter can be exploited to start the reaction or disintegration desired, which means that the choice of chemical substances is not restricted to those that have a temperature of reaction for reaction or disintegration in the range of 100° C. It is also possible, especially, to employ various substances with different temperatures of reaction to achieve a passive inerting effect staggered in time according to increases in temperature. The arrangement of the substances in the vicinity of the catalysts offers the added advantage that the released $CO_2$ and/or steam can rapidly mix in with the surrounding atmosphere due to the convection currents caused by the heated-up catalyst structure.

The heat resulting from the catalysts can thus be exploited to great advantage for purposes of passive inerting. On the other hand, the withdrawal of heat that this involves will prevent the temperature in the catalysts rising too high, which otherwise could cause the gas mixture to ignite.

Embodiments of the present invention are discussed in greater detail with reference to the schematic drawings attached, as follows:

BRIEF DESCRIPTION OF DRAWINGS

FIG. 1a a is a front view of a catalyst plate equipped with inerting elements in accordance with the present invention;

FIG. 1b is a lateral view of the catalyst plate in the direction of arrow B in FIG. 1a;

FIG. 1c is a partial lateral view of the catalyst plate in the direction of arrow C in FIG. 1a;

DETAILED DESCRIPTION OF INVENTION

In the following the present invention will be described with reference to examples of embodiments in which the inerting elements are combined with a catalyst structure to form a protective unit. It should be reemphasized at this point that this combination of a catalyst structure and inerting elements causes additional synergetic effects and that, even though only such examples of embodiments referring to this are described, inerting elements according to the present invention can be employed independently of any catalyst structure.

Figures 1A, 1C:
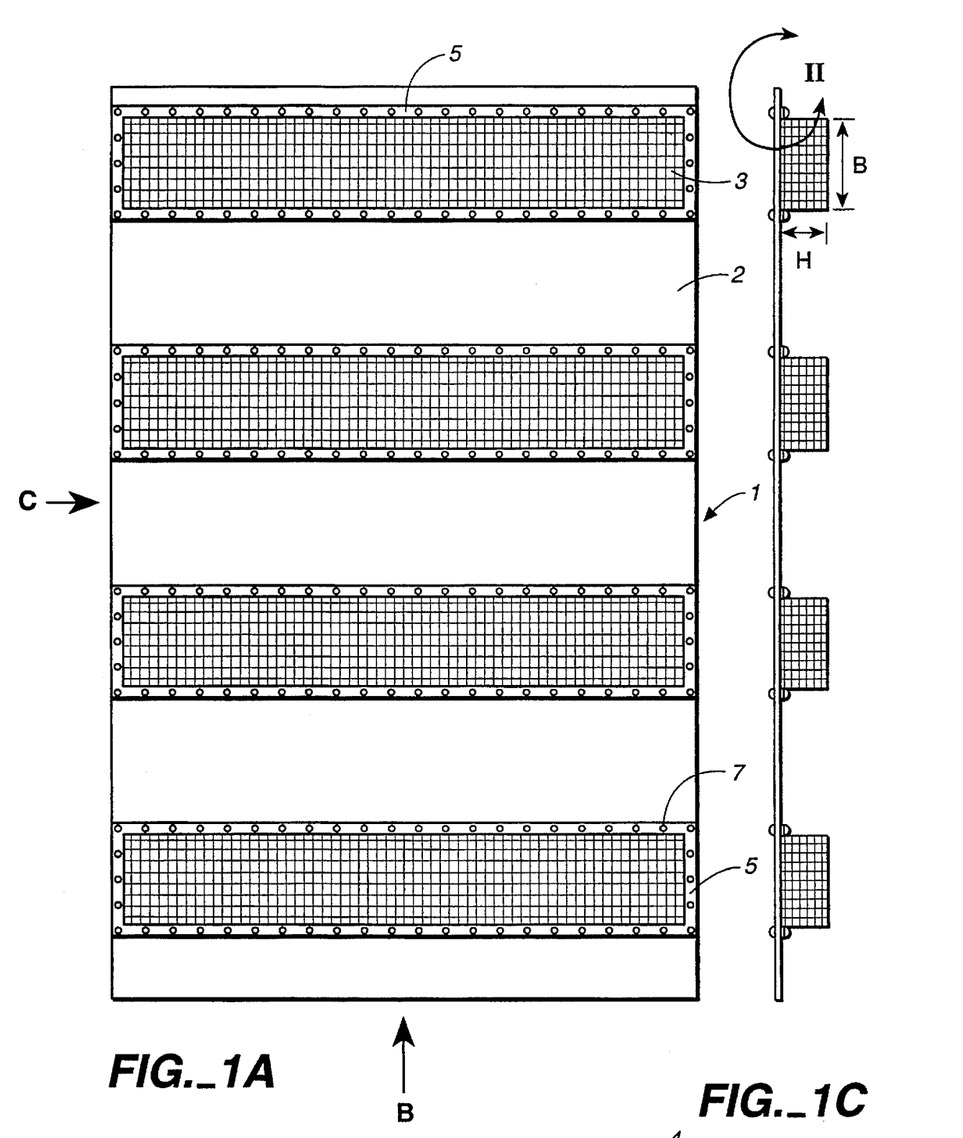
Figure 1B:
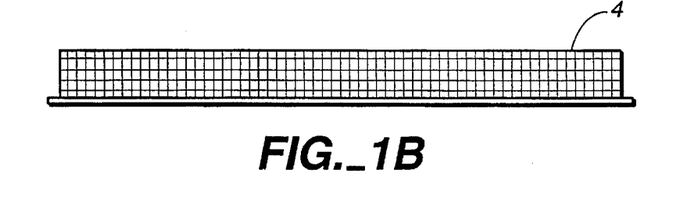
Figure 2:
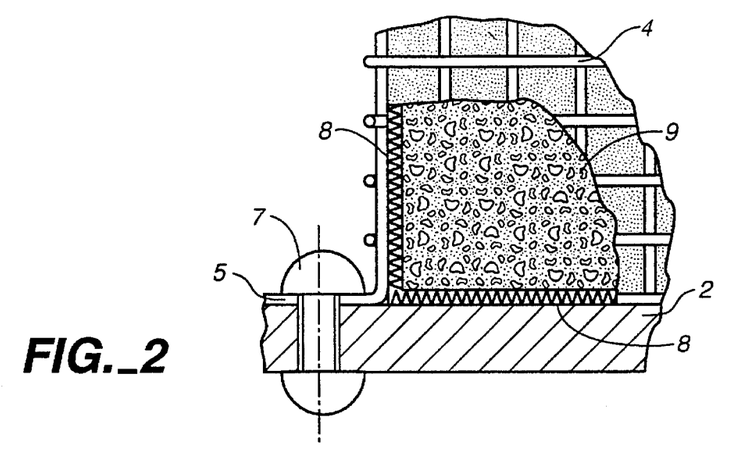
FIG. 2 is an enlarged illustration of a section in detail of the catalyst plate marked off as II in FIG. 1c.

FIGS. 1 and 2 show a preferred embodiment of the present invention in the form of a protective unit 1, which is composed of a catalyst plate 2 and inerting elements 3 attached to it. In catalyst plate 2, for example, a carrier plate made of stainless steel is shown, which preferably will be coated on either side with a catalyst material as described, for example, in DE-A-37 25 290. Instead of this, the catalyst plate 2 could also consist entirely of the catalyst material. The inerting elements 3 are each comprised of a box-like receptacle 4 made of a grid-like material of stainless steel wire which is equipped in the region of its bottom with a flange 5 jutting outwardly for attachment to the catalyst plate 2. The box, as will be recognizable in the partially broken open sectional drawing in FIG. 2, is filled with the inerting material 9 in the form, for example, of powder, granules, crystallite or the like. The receptacle 4 of the inerting element 3, as indicated in FIG. 2, can be connected to the catalyst plate with the aid of bolts 7 and nuts or in any other suitable manner.

As may be seen in FIG. 2, in the embodiment depicted the bottom of the receptacle 4 is open but a filter layer 8 some 1 mm thick is located between the surface of the catalyst plate 2 and the inerting material. An identical filter layer is provided between the walls of the receptacle 4 and the inerting material located within. The filter layer is a so-called HEPA (High Efficiency Particulate Air) filter. These are filters composed of glass wool and a binding material, which have a high resistance at higher temperatures (up to some 850° C.). These filters will allow hydrogen, oxygen, steam and $CO_2$ to pass through, but shield off aerosols and fatty particles from the inerting material and, in addition, prevent any direct contact between the catalyst plate and the inerting material which might possibly cause any undesired reactions. If the inerting material is in the form of particles before and/or after disintegration, the filter will then simultaneously prevent it from falling through the grid-like walls of the receptacle 4.

One or several of these inerting elements (four are shown in FIG. 1 by way of example) is attached to the catalyst plate 2 in such a manner that some catalyst surface will still be left free for the catalytic reaction. The portion of the surface left free, as well as the number and size of the inerting elements, are determined in dependence upon the place in which the protective unit is to be deployed, more precisely, in dependence upon the supply of hydrogen to be expected and the necessary degree of inerting expected in the respective place where deployed. By increasing the height H of the inerting elements with a corresponding decrease in its breadth B, the portion of free catalyst surface can be increased. In dimensioning it thus, it has to be considered that, given sufficient porosity of the inerting material, the surface of the catalyst plate covered by the inerting elements is not entirely lost for purposes of the catalytic reaction since hydrogen and oxygen can also penetrate the inerting elements through to this surface. This will apply in even greater degree to the condition following disintegration of the inerting material since the porosity of the products remaining after disintegration, with most inerting materials that come into consideration will be much larger than that prior to disintegration.

As soon as hydrogen is released into the atmosphere of the compartment containing one or several protective units 1 of this type, the, catalytic transformation of the hydrogen with the oxygen into water will occur and the catalyst plate 2 will heat up. Owing to the good heat conductivity of the catalyst plate 2, the surface areas covered with the inerting elements will also be heated up evenly regardless whether they participate themselves in the catalytic reaction or not. The resulting heat will heat up the inerting material in the receptacles 4 of the inerting elements until the disintegration of the inerting materials and inerting begins to occur through the release of $CO_2$ and/or steam when the characteristic temperatures of reactions am reached for each respective inerting material. The convection currents forming in the vicinity of the catalyst plate having a higher temperature than the surrounding will carry along the inerting gases that form and mix them with the surrounding atmosphere.

It should be emphasized at this point that although in the example of the embodiment described here the inerting elements 3 are arranged only on one side of the catalyst plate 2, a duplicate arrangement of additional inerting elements can be provided on the other side of the catalyst plate. If this is done, the inerting elements on either of the two opposing sides are preferably arranged in staggered order to one another so that a uniform distribution of heat and reaction capacity will be guaranteed for the catalyst plate.

To achieve a release of inerting gases staggered in time, it is possible either to place inerting materials having different temperatures of reaction inside each individual inerting element or various inerting elements could contain inerting materials with different temperatures of reaction. In the former case the different inerting materials will be placed in layers preferably parallel to the catalyst plate so that the inerting material with the highest temperature of reaction will be located closest to the surface of the catalyst and that with the lowest temperature of reaction will be situated the most distant. In so doing, the gases forming at the time the inerting material directly adjacent to the surface of the catalyst disintegrates and, by pressing outwardly, will cause the materials situated farther outward to heat up and will cause them to disintegrate, if this has not already happened. The temperature of reaction of the inerting material situated in the immediate vicinity of the catalyst structure should lie at around 200° to 450° C., and preferably in the range of 300° to 350° C., so that the synergistic effect between these two types of protective units will be optimized.

Since, as pointed out above, inerting materials are available with a temperature of reaction in the vicinity of 100° C., their use would cause a release of inerting gases at the beginning, even before any notable heating-up of the catalyst plate 2 had occurred. As the catalyst plate 2 heats up and passes on a part of this heat to the inerting elements, the inerting materials with higher temperatures of reaction would start to take their effect as the respective temperature of reaction is reached for each one. The transfer of heat from the catalyst plate 2 to the inerting elements 3 has the beneficial side-effect of limiting the increase in temperature of the catalyst plate. This prevents the catalyst plate from reaching a temperature that in turn could trigger an ignition, at least until the complete inerting process caused by the inerting elements has occurred.

If it is anticipated that a great amount of hydrogen will be released within one of the compartments protected by the device in accordance with the present invention, it is preferable to employ for at least part of the inerting materials such a material that has a temperature of reaction of around 100° C. In this manner the desired inerting effect will occur at the beginning phase of an accident, to remove the danger of flame propagation and detonation. Hydrogen is removed by the catalytic transformation before a concentration of hydrogen required for deflagration is reached.

Figure 3:
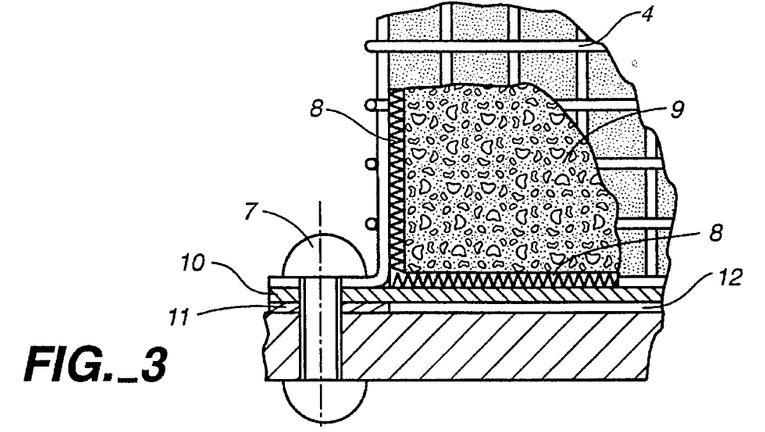
FIG. 3 is a view analogous to that shown in FIG. 2 illustrating a modified embodiment.

FIG. 3 shows a perspective view corresponding to that in FIG. 2 of a variation of an embodiment which differs from the one previously described in that the inerting elements are attached to the catalyst plate 2 with the intervening layer of a bottom 10 and insertion of spacing disks 11 in such a manner that an interspace is created between the inerting element and the surface of the catalyst plate. By means of this interspace, the surrounding atmosphere has free access to the catalyst surface which will be even more enhanced by the convection currents forming as the catalyst plate heats up. The bottom plate 10 and the spacing disks 11 will be made preferably of metal with good heat conductivity to guarantee the desired transfer of heat from the catalyst plate to the inerting element. Provision can be made for holes in the bottom plate 10 through which the inerting gases forming in the region of the bottom of the inerting element 3 can escape.

Figure 4:
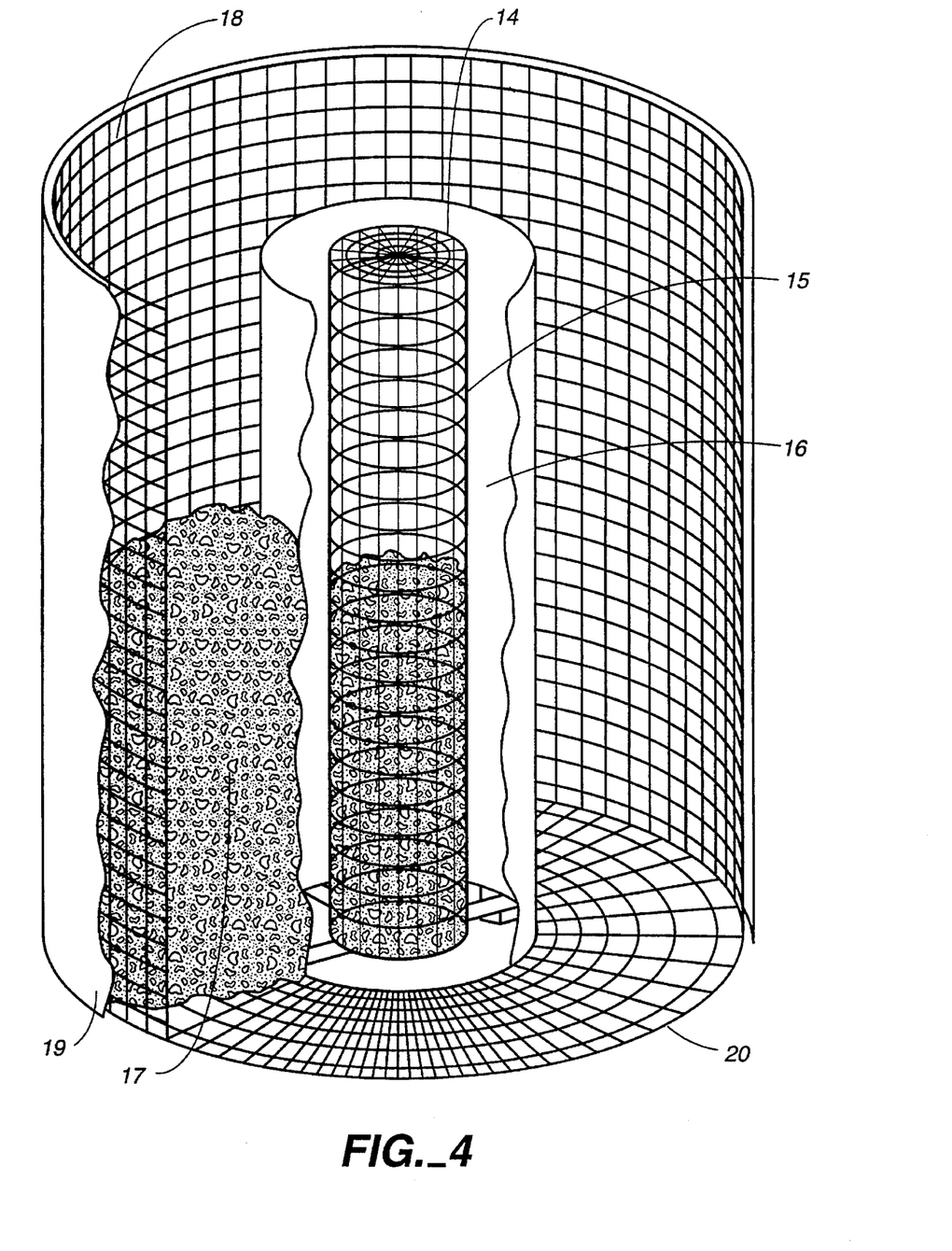
FIG. 4 is another embodiment of a catalyst structure with an inerting element.

FIG. 4 is a perspective view illustrating of a further embodiment of the present invention in which a catalyst structure and the inerting elements are arranged in the form of a concentric cylinder. A first inerting element 14 is located in the center with a hollow cylinder 15 made of a grid-like material and containing the inerting material. The inerting element 14 is surrounded concentrically by the catalyst structure 16 in the form of a cylindrical casing made of stainless sheet steel coated with the catalyst material. The catalyst structure 16 is surrounded by a second inerting element 17 with an outer cylindrical casing 18 made of grid-like material. The latter is covered on its outer side with a filter layer 19 composed of the HEPA filter material mentioned above. If the cylinder casing of the catalyst structure 16 is coated with the catalyst material only on the inside, its outer surface can simultaneously form the inner border area of the second inerting element, as shown in FIG. 4. If, however, the catalyst cylinder is also coated on the outside, depending on what catalyst surface is desired, then the second inerting element could usefully have an additional inner cylinder casing, not shown in FIG. 4, made of grid-like material which would be situated at a suitable interval from the catalyst cylinder casing to allow for the adequate flow of gases. A bottom 20, also made of a grid-like material, closes off the second inerting element below and serves as a support for the inerting material. The appropriate means for making the mechanical connection between the individual parts of the structure shown in FIG. 4 are not included in this illustration for simplicity's sake.

The shaft-like structure of the arrangement seen in FIG. 4 will cause an increased convection current because of a chimney effect, with the result that the inerting gases forming will be quickly distributed. Although not shown in FIG. 4, filter layers similar to the filter layers 8 shown in FIG. 2 and 3 could be placed here between the inerting material and each respective grid enclosing it.

Figure 5:
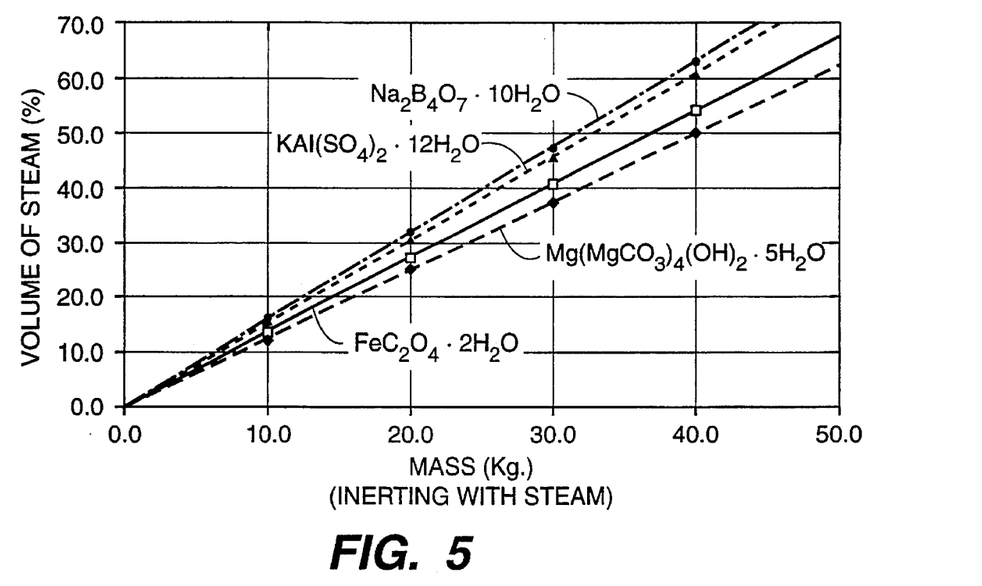
FIG. 5 and 6 are diagrams for explaining the inerting effect of various substances that may be employed within the scope of the present invention.
Figure 6:
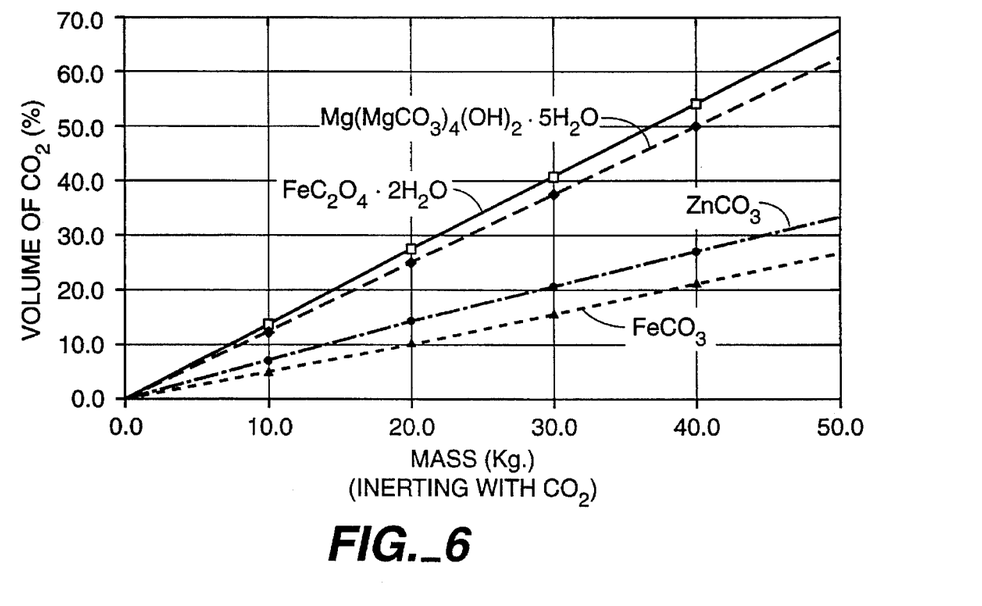

FIG. 5 is a diagram relating to a compartment capacity of 50 m³ which shows, for four different inerting materials, the calculated steam content that can be achieved as a function of the mass of the inerting material. FIG. 6 is a similar diagram which shows, for four different inerting materials, the calculated $CO_2$ content that can be achieved as a function of the mass.

Reference is now made to FIG. 5. The four inerting materials considered here by way of example release steam at different temperatures of reaction (temperatures of disintegration); thus, the temperature of reaction (temperature of disintegration) of $KAl(SO_4)_1.12H_2O$ is only slightly higher than 100° C. while $Na_2B_4O_7.10H_2O$ needs to be raised to a temperature of reaction of 350° C. The combination of various inerting materials with different temperatures of reaction within various inerting elements causes, as pointed out above, the release of steam staggered in time in accordance with the increase in temperature. If the lowest of the different temperatures of reaction of the various inerting materials lies at about 100° C., which is to say at a temperature which could even be reached without any heating-up caused by catalytic reaction, then the pertinent inerting material will not take away any heat from the catalyst plate; thus, the catalyst plate will then quickly reach a higher temperature that will contribute significantly to the catalytic reaction. The more hydrogen that is catalytically converted per unit time, the more intensely the concentration of hydrogen will be lowered but more inerting will also be achieved because of the steam generated by the catalytic reaction.

It is immaterial for inerting by steam whether the steam comes as the result of catalytic transformation of hydrogen or from the inerting material. The steam will need a certain amount of time to reach a cold wall at which it condenses. A high concentration of steam will establish itself, despite its being constantly condensed at the cold walls, because it is steadily produced through catalytic reaction and through the inerting elements. This condensation contributes to avoiding toe, great an increase in pressure caused by the steam being released. After the catalytic reaction is completed, because of the removal of the hydrogen, it is possible that a global relief in pressure will occur; therefore, an active reduction in the pressure of the atmosphere in the reactor containment can possibly be avoided.

It may be seen in FIG. 5 that as little as 10 kg of the inerting materials described can contribute 12 to 15% by volume of the steam (related to a compartment capacity of 50 m$^3$). In FIG. 6 similar conditions prevail for the production of $CO_2$. At this point it should be pointed out that the chemical substances used as examples of inerting materials have a 40 to 60% portion of water of crystallization or $CO_2$. If inerting materials with higher portions are employed, it will be possible to work with correspondingly lower masses.

Figure 7:
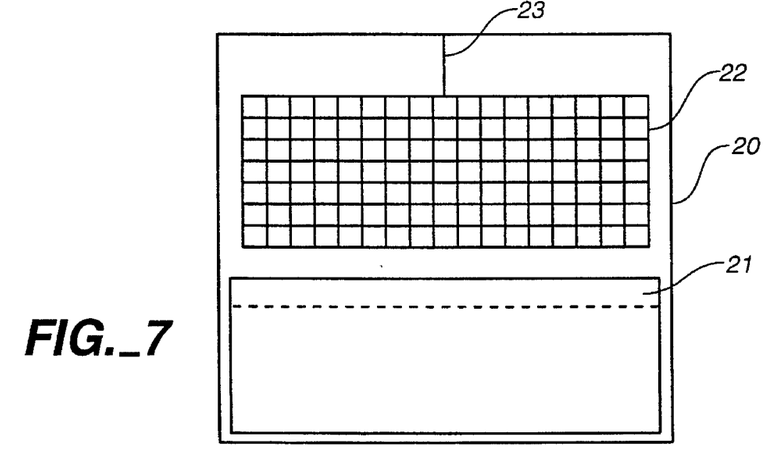
FIG. 7 is a schematic representation of an additional embodiment of the present invention.

FIG. 7 illustrates an embodiment of the invention in which various materials used for releasing an inerting gas or inerting gas mixture are employed to react with one another. The embodiment depicted is suitable for cases in which a solid material and a liquid are intended to react with one another. Located in the lower region of a frame 20 is a tub 21 made of a suitable material in which hydrochloric acid, for example, may be placed. A wire basket 22 made of stainless steel is suspended above the tub 21. Calcium carbonate (in this example) is placed in the wire basket. The suspension 23 of the wire basket is constituted so that it will release when reaching a certain pre-determined temperature, whereupon the wire basket will drop into the tub 21 containing the hydrochloric acid. The size of the mesh of the wire basket will be established such that the calcium carbonate with which it is filled will not drop out, but also such that the hydrochloric acid, once the wire basket drops into the tub, can freely penetrate into it and the desired reaction will take place. The suspension can contain, for example, a soldered point with a solder having a melting temperature equal to the temperature desired for the inerting gas mixture to be released.

The above embodiment may also be combined in an advantageous manner with a catalyst structure; however, this does not appear in the illustrations. For this purpose it would be necessary only to establish a connection with good heat conductivity between the suspension 23 and a catalyst structure located in close proximity.

The above described embodiments of the present invention represent a large variety of forms in which the present invention can be realized. What is important is that the chemical substance(s) employed for passive inerting according to the present invention will be situated in the compartment to be protected in a manner that permits the free exchange of gas with the atmosphere of the compartment. A housing with gas-permeable walls can hold together both the substance prior to its disintegration or the reaction and also the product of the reaction that remains. Wherever an inerting element in accordance with the present invention is used in conjunction with a catalyst structure, care must be taken that the catalytic recombination is not adversely affected and that the desired transport of heat to the inerting element can take place. In addition, it must be guaranteed that once the inerting gas has been released by the inerting element, its remaining product of reaction (which accordingly should preferably not be liquid) is kept away from the catalyst structure to not impede its effect.

I claim:

1. A device for preventing the formation of a flammable mixture of hydrogen and oxygen in a reactor containment of a nuclear power plant, said device comprising one or more inerting elements situated in the reactor containment, each element comprising one or more chemical substances which deliver an inerting gas and/or inerting gas mixture through disintegration and/or chemical reaction at temperatures greater than or equal to a respective temperature of reaction.

2. The device according to claim 1, wherein the inerting gas and/or inerting gas mixture comprises carbon dioxide and/or steam.

3. The device according to claim 2, wherein the proportion of carbon dioxide and/or water of crystallization of at least one of the chemical substances is at least 45% of the respective molecular weight.

4. The device according to claim 1, further comprising one or more hydrogen/oxygen catalytic recombiners situated in the reactor containment, wherein at least one of the inerting elements is arranged to be heated through thermal conduction, radiation and/or convection in response to a catalytic reaction at one or more of the catalytic recombiners.

5. The device according to claim 1, 2 or 4 comprising a plurality of the inerting elements, each of the elements comprising a respective chemical substance, wherein the temperature of reaction of the respective chemical substance of at least one inerting element differs from the temperature of reaction of the respective chemical substance of another of the plurality of inerting elements.

6. The device according to claim 1 or 4, wherein one or more inerting elements have a receptacle containing the one or more chemical substances, the walls of the receptacle being permeable by the inerting gas and/or the inerting gas mixture.

7. The device according to claim 6, wherein a filter layer comprising High Efficiency Particulate Air filter material is located on or near the receptacle walls.

8. The device according to claim 4, wherein at least one of the catalytic recombiners comprises a catalyst plate to which one or more of the inerting elements are connected in a manner having good heat conductivity.

9. The device according to claim 8, wherein the temperature of reaction of a substance lying in the immediate vicinity of the catalyst plate or in contact with it is in the range of 200° to 450° C.

10. The device according to claim 8, wherein the one or more inerting elements are connected at such a distance from the surface of the catalyst plate as to permit free access of the surrounding atmosphere to the surface of the catalyst plate.

11. The device according to claim 8 or 10, wherein at least one of the one or more inerting elements contains a plurality of chemical substances having different temperatures of reaction and arranged in layers, the substance having the highest temperature of reaction in a layer adjacent to the catalyst plate.

12. The device according to claim 1 or 4, wherein at least one of the one or more inerting elements contains a plurality of chemical substances having different temperatures of reaction.

13. The device according to claim 1 or 4, wherein the chemical substance leaves no liquid product of reaction remaining after disintegration or reaction takes place.

14. The device according to claim 1, 2 or 4, wherein at least one of the one or more inerting elements comprise a chemical substance which during disintegration or reaction forms a product capable of combining with oxygen in the gas mixture of the surrounding atmosphere.

15. A device for reducing the risk of deflagration or detonation of a flammable gas in a reactor containment of a nuclear power plant, said device comprising one or more inerting elements situated in the containment, each element comprising one or more chemical substances which deliver an inerting gas and/or inerting gas mixture through disintegration and/or chemical reaction at temperatures greater than or equal to a respective temperature of reaction.

16. The device according to claim 15, further comprising one or more catalytic structures situated in the reactor containment, wherein at least one of the inerting elements is arranged to be heated through thermal conduction, radiation and/or convection in response to oxidation of the flammable gas catalyzed by one or more of the catalytic structures.

17. A device for preventing the formation of a flammable mixture of hydrogen and oxygen in a reactor containment of a nuclear power plant, said device comprising inerting means situated in the reactor containment for inerting the mixture of hydrogen and oxygen in response to a temperature reaching and/or exceeding a temperature of reaction, combiner means for catalytically oxidizing the hydrogen, and means for transferring heat generated at the combiner means to the inerting means.

18. A device according to claim 17, wherein said inerting means comprises means for removing and/or reducing oxygen in the reactor containment.

* * * * *